Patented Mar. 9, 1937

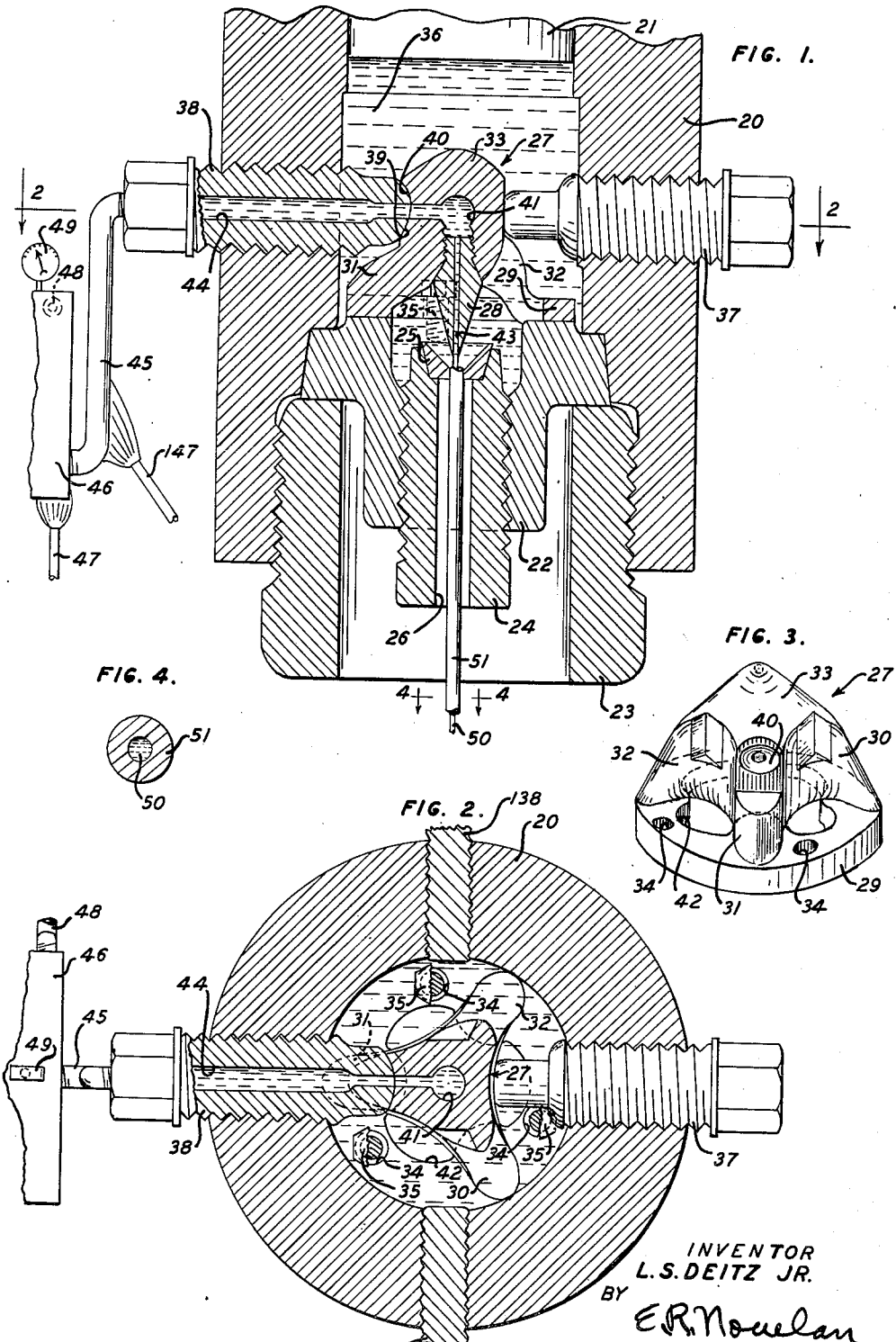

2,073,465

UNITED STATES PATENT OFFICE 2,073,465

MATERIAL FORMING APPARATUS

Louis S. Deitz, Jr., Metuchen, N. J., assignor to Nassau Smelting and Refining Company, Incorporated, New York, N. Y., a corporation of New York Application February 11, 1936, Serial No. 63,354

5 Claims. (Cl. 207—17)

This invention relates to material forming apparatus and more particularly to extrusion apparatus for making strands, bars and the like of two materials in which one material is formed as an envelope positioned coaxially about the other.

What is known as flux core solder is a commercial product of the kind in view. This is manufactured in slender axially hollow rods or tubes of metallic soldering material, usually an alloy of lead and tin, in which the axial cavity is filled with a fluxing material. These flux cored rods of solder may be manufactured by extruding the metal tube from a press in which means are provided to supply core material to the hollow center of the tube as it is formed.

An object of the present invention is to provide an extrusion apparatus in which means are provided, adjustable at all times, to regulate and control the coaxiality of the two components of the product.

In one embodiment of the invention, there is contemplated an extrusion press having an exit die to form the outer surface of the product to the desired cross sectional form and size, this die being attached to or secured in the wall of the extrusion cylinder, a bodily movable combined mandrel and supply member within the cylinder to form the inner surface of the product envelope and to supply filler material thereto, and means to adjust the member relatively to the die by shifting the same bodily without any necessity for dismantling or disassembling the apparatus.

Other objects and features of the invention will appear from the following detailed description of one embodiment of the invention taken in connection with the accompanying drawing in which the same reference numerals are applied to identical parts in the several figures and in which Fig. 1 is a diametral longitudinal section of the exit end of the cylinder of an extrusion press constructed in accordance with the invention;

Fig. 2 is a transverse sectional view thereof on the line 2—2 of Fig. 1;

Fig. 3 is a detached view in central perspective of the movable core guide and control member as seen from the left in Fig. 1, and Fig. 4 is an enlarged section on the line 4—4 of Fig. 1.

In the embodiment of the invention herein disclosed an extrusion press of any approved construction has an extrusion cylinder 20 and a ram 21 therein and means not shown to reciprocate the ram in the cylinder. The outer end of the cylinder is closed by a die block 22 held in place by a locking ring 23 which is screwed into the end of the cylinder. A pillow 24, externally threaded, engages the internally threaded surface of an axial bore in the die block 22 and is thus axially adjustable with respect to the cylinder. The inner end of the pillow is formed with a recess for the reception of an extrusion die 25 and the pillow has an axial bore 26 to permit the extruded product 50, 51 to pass out from the die.

A combined forming mandrel and material guide member generally indicated by the numeral 27 is supported on the inner end surface of the die block 22. This member consists of a body and a detachable guide 28. The body is preferably an integral unit having a generally annular, flat bottomed base 29, three legs 30, 31 and 32, and a head 33. The base has three vertical perforations 34 and is slidably secured to the die block 22 by screws 35 passing through the perforations 34, the perforations being larger in diameter than the screws.

The member 27 is held in position laterally in one direction by being jammed between the ends of two laterally disposed, axially aligned, and opposing adjustment screws 37 and 38, and in the direction at right angles thereto by a similar pair of screws 137 and 138, all mounted in appropriately threaded bores in the side wall of the cylinder. The screws 37, 137 and 138 are substantially flat at their inner ends and may bear against corresponding flat vertical faces formed on the head 33 of the member 27. The inner end of the screw 38 is spherically convexly curved as shown in Fig. 1 at 39 and bears against a correspondingly spherically concavely curved facet 40 formed in the head 33 over the leg 31.

A central cavity 41 within the head 33 communicates downwardly via a vertical threaded bore with the space between the three legs and thence with an opening 42 in the center of the base 29. The conical, detachable guide 28 is externally threaded at its upper end to be removably secured in the vertical threaded bore in the head, and has an axial bore 43 communicating at its upper end with the cavity 41 and at its lower end with the open space immediately above the bore of the die 25.

The screw 38 has an axial bore 44 throughout its length, which communicates at its inner end with the cavity 41 via a suitable corresponding horizontal bore in the head 33. The outer end of the bore 44 is connected via a tube 45 with an appropriate supply of core material, here shown as a closed tank 46 to hold a supply of rosin or of other fusible core material. Means such as burners 47 and 147 may be provided if necessary to maintain the core material in a liquid state. Means such as a pipe 48 connected to a supply of compressed air not shown, may be provided to maintain the core material under pressure for feeding the same to the guide 28, and means such as a gauge 49 to indicate the feeding pressure. In some instances it is satisfactory to feed the core material simply by gravity.

In operation a die 25 and a guide 28 having appropriately dimensioned bores for the particular size of product desired are mounted respectively in the pillow 24 and in the head 33. The member 27 is adjusted on the block 22 until the guide 28 is coaxial with the die 25, when the screws 34 are tightened to hold the parts thus adjusted while being set as a unit into the end of the cylinder and locked there by the ring 23. The screws 37 and 38 are then brought into contact with the head 33. The screws 137 and 138 are normally not allowed to project within the cylinder but are positioned as shown in Fig. 2 and are idle. The tank 46 is filled with core material, e. g. rosin and this is melted by the burner 47. The cylinder 20 is filled with molten envelope material, e. g. solder, and the ram put in operation. Pressure is turned on through the pipe 48. The pressure of the ram forces the plastic solder through the three spaces between the legs 30, 31 and 32, down through the aperture 42 and around the conically tapering outer surface of the guide 28.

At the same time the flux is forced through the pipe 45, the bore 44, the cavity 41, and the bore 43, and so out of the tip of the guide 28, where it meets and is enveloped by the downflowing solder. The two materials are thus extruded through the die 25 in the form of a central strand 50 of flux material enveloped by a tube 51 of solder.

Under the pressures developed within the cylinder during this extrusion operation there will almost necessarily be elastic deformation of the member 27 which may throw the tip of the member 28 out of axial alignment with the die 25. When this occurs, the core 50 of the product will not be coaxially positioned in the envelope and the condition may even arise where the core is sufficiently displaced to be incompletely enveloped. This being an undesirable condition or even fatal to the usefulness of the product, means have been provided in the screws 37, 38, 137 and 138 for adjustment of the guide 28 with respect to the die 25.

It is evident from a consideration of Figs. 1 and 2 that the member 27 is symmetrical with respect to the plane through its axis on which Fig. 1 is taken, the vertical plane in Fig. 2 determined by the axis of the bore 44 and perpendicular to the plane of the view. Hence all stresses tending to warp or move the member 27 up or down in Fig. 2 (front or back in Fig. 1) are normally offset by symmetrically equal and opposite stresses. There will ordinarily be no shifting of the tip of the guide 28 in these directions. The member 27 is however by no means symmetrical about a vertical axial plane at right angles to the plane of Fig. 1. There are two legs, 30 and 32, on the right side of this plane and only one, 31, on the left, and the relations of the screws 37 and 38 to the head 33 are different. Stresses acting from right to left and vice versa are therefore unbalanced and the member may warp to shift the tip of the guide 28 out of alignment with the die 25 to the right or left, and thus to occasion excentricity of the core 50 in the envelope 51.

After the operation has been started therefor, the product is inspected, and if excentricity is found, it is easy to determine which way and how much the guide 28 is to be shifted relatively to the die 25. This may then be accomplished by means of the screws 37 and 38. In some instances it will be found that there is relative displacement of the guide and die in the plane of the screws 137 and 138, perhaps due to uneven temperature distribution within the solder mass. Although this is relatively infrequent the screws 137 and 138 are provided by which such displacement may be corrected.

Displacement of the guide 28 relatively to the die is presumably occasioned by warping of the member 27 generally. This warping tends to change the relative alignment of the head 33 with respect to the screw 38 and its bore 44. The overhanging inner end of the screw 38 may also be warped by the pressures under consideration. If the coacting bearing surfaces of the end of the screw 38 and of the head 33 were plane, such warpings might well tilt one such plane face with respect to the other, and thus open the joint and permit solder to be forced into the rosin passages. Hence the ball and socket joint is provided between the screw 38 and the head 33. It is found that warping sufficient to derange the alignment of the guide 28 with the die 25 will occur without being also sufficient to open the ball and socket joint to admit solder to the rosin passages.

The adjustment effected by the screws 37, 38, 137 and 138 is done by sliding the body member 27 bodily on the die block 22, this being possible because of the fact that the screws 35 are of less diameter than the holes 34.

The invention is herein illustrated as embodied in an extrusion press adapted for the manufacture of rosin core solder; but obviously it is not limited to any particular materials or combination of materials in the product, but is applicable in the manufacture of any extruded product having a core and an envelope.

The embodiment of the invention herein disclosed is illustrative only and may be widely modified and departed from without departing from the spirit and scope of the invention as pointed out in and limited only by the appended claims.

What is claimed is:

1. In an extrusion press having an extrusion cylinder and a die mounted therein, a core feeding device within the cylinder and comprising a body member and a guide member, the body member having an annular base, a leg integral therewith and a hollow head integral with the leg, the guide member being secured to the body member and having a bore therein communicating with the cavity in the hollow head, and means to shift the core feeding device bodily with respect to the die comprising a pair of opposed screws mounted in the cylinder wall, one of said screws having an axial bore therein communicating with the cavity in the hollow head and said axially bored screw having a curved surface at the inner end thereof abutting against a corresponding complementarily curved surface formed on the head of the body member.

2. In an extrusion press having an extrusion cylinder and a die therein, an adjustable core feeding device within the cylinder, and a pair of opposed screws mounted in the wall of the cylinder and abutted against the feeding device to move the same bodily to adjust it with respect to the die, one of said screws having a passage therein for supplying core material to the core feeding device, and the same screw having a curved surface at the inner end thereof abutting against a complementarily curved surface found on the feeding device.

3. In a extrusion press having an extrusion cylinder and a die therein, a core feeding device adjustably mounted within the cylinder, and means to adjust the device by sliding the same bodily transversely of the cylinder in one linear direction only, the device being symmetrical in form with respect to one plane through the direction of adjustment and asymmetrical in form with respect to a plane through its center and perpendicular to the direction of adjustment.

4. In an extrusion press for making strands comprising an envelope of one material formed as a sheath about a rod shaped core of another material, and having an extrusion cylinder and a die therein, a core feeding device mounted within the cylinder to be adjustable therein by sliding bodily transversely thereof in one linear direction only, the core feeding device comprising a generally annular and plane base, a head supported on the base to be offset from the plane of the base, and a core material guide extending from the head into the central aperture of the annular base, the head and the guide being provided with internal core material passages.

5. In an extrusion press for making strands comprising an envelope of one material formed as a sheath about a rod shaped core of another material, and having an extrusion cylinder and a die therein, a core feeding device mounted within the cylinder to be adjustable therein by sliding bodily transversely thereof in one linear direction only, the core feeding device comprising a generally annular and plane base, a plurality of legs rising from one side of the base, a head supported on the legs to be offset from the plane of the base, and a core material guide extending from the head into the central aperture of the annular base, the head and the guide being provided with internal core material passages.

LOUIS S. DEITZ, Jr.